Figure 1:
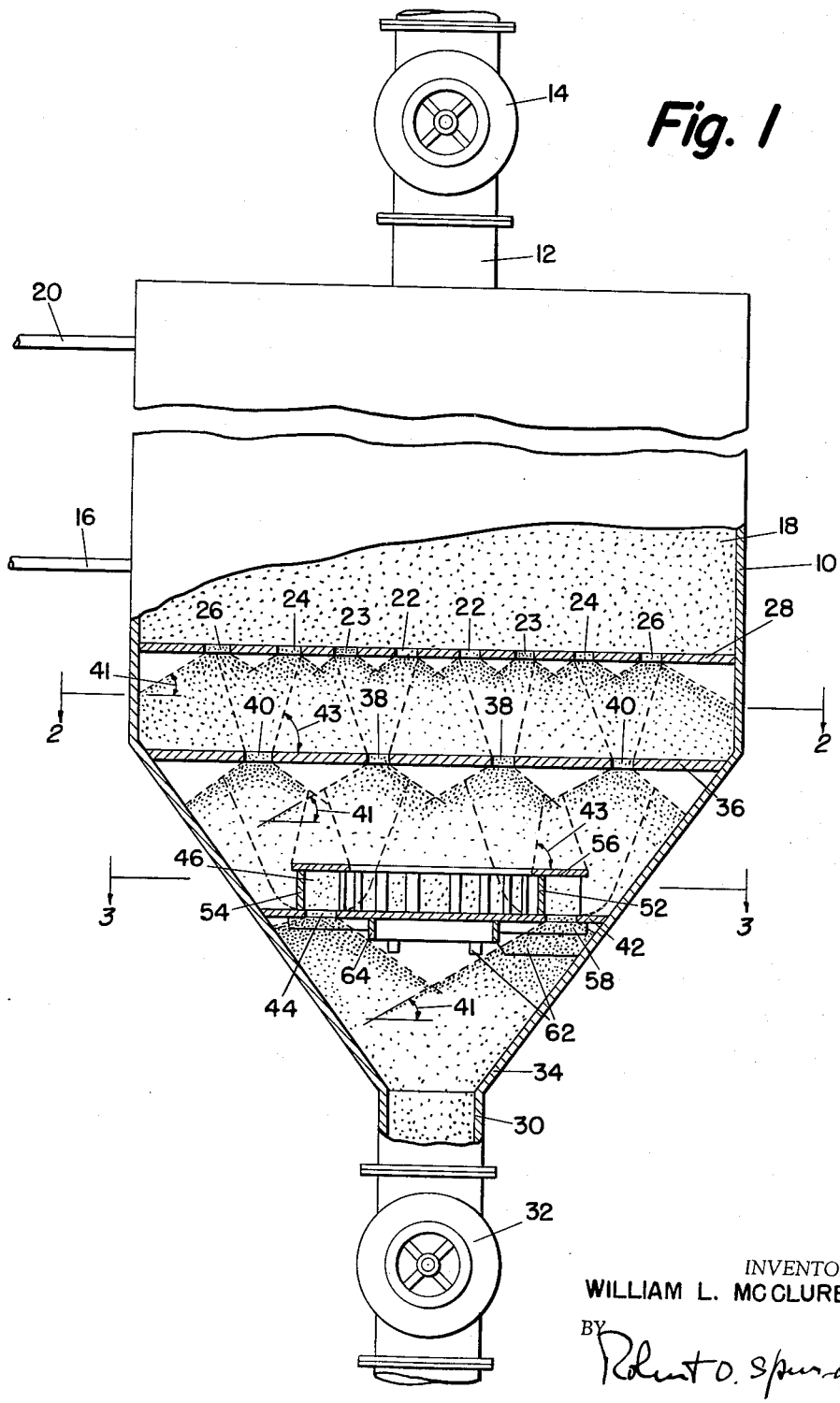

Aug. 15, 1961  W. L. McCLURE  2,996,362
APPARATUS FOR CONTACTING FLUIDS WITH SOLID CONTACT MATERIALS
Filed May 12, 1958  2 Sheets-Sheet 1

INVENTOR.
WILLIAM L. MCCLURE
BY Robert O. Spurdle
ATTORNEY

Aug. 15, 1961 W. L. McCLURE 2,996,362
APPARATUS FOR CONTACTING FLUIDS WITH SOLID CONTACT MATERIALS
Filed May 12, 1958 2 Sheets-Sheet 2

INVENTOR.
WILLIAM L. MC CLURE
BY
ATTORNEY

United States Patent Office 2,996,362
Patented Aug. 15, 1961

2,996,362
APPARATUS FOR CONTACTING FLUIDS WITH SOLID CONTACT MATERIALS
William L. McClure, Toledo, Ohio, assignor to Sun Oil Company, Philadelphia, Pa., a corporation of New Jersey
Filed May 12, 1958, Ser. No. 734,561
6 Claims. (Cl. 23—288)

This invention relates to apparatus wherein fluids are contacted with particle form solid contact mass material, and more particularly to apparatus which provides for more uniform contacting of such fluids with the contact mass material.

Processes are known wherein hydrocarbons are contacted with a solid contact mass material capable of effecting or influencing a desired conversion of such hydrocarbons to useful products such as gasoline. For example, hydrocarbon materials may be cracked by contacting, at certain known temperatures, with a particle form solid contact mass of a material such as alumina, silica, silica-alumina, and similar materials. Other hydrocarbon conversion reactions, such as hydrogenation, isomerization and alkylation are also carried out by contacting the hydrocarbon with a particle form solid contact mass material.

Such reactions result in the deposit of a combustible substance commonly known as coke on the particles of the solid contact mass material, thereby causing the contact mass material to be deactivated. The material is usually regenerated by burning off the deposited substance, and the contact mass material is returned to the reaction. A preferred method of regenerating has been to gravitate the solid contact mass material slowly through a reactor while injecting a combustible gas or oxygen, at combustion temperature, whereby the coke is burned off. Combustion products are drawn off the top of the reactor, and the regenerated contact mass material gravitates through a reduced-area outlet at the bottom of the reactor.

In this regeneration process, as in the hydrocarbon conversion processes referred to, and other processes involving the contacting of a fluid with a particle form solid contact mass material, it is desirable, in order to obtain maximum efficiency of the process, that the contact mass material be uniformly contacted by the fluid. In operations where the contacting takes place in a reactor wherein the particle form solid contact mass gravitates therethrough during the reaction, it is therefore desirable that the contact mass gravitate at a uniform rate over substantially the entire cross-sectional area of the reactor.

The terms "reactor," "reaction vessel," "reaction zone," and the like as used herein are understood to include apparatus wherein hydrocarbons are converted by contact with a particle form solid contact mass material, or wherein the solid contact mass material is regenerated, or wherein other similar processes take place.

Such reactors generally have a reduced-area outlet for the solid contact mass material, with valve means to regulate the flow of the material. The conical or similarly shaped connecting zone between the reaction zone and the reduced-area outlet of the reactor causes a wide variation in the rate of flow of the gravitating solid contact mass material, since the material flows much more rapidly directly over the outlet than at other points. It is a principal object of this invention to provide a reactor having means causing substantially uniform flow of the solid contact mass material through the reaction zone whereby it is substantially uniformly contacted by the fluid reactant.

According to the invention, one or more perforated plates are positioned in the reaction vessel below the reaction zone, and one or more proportioning plates are positioned below the perforated plates. The uppermost perforated plate functions as a partition between the reaction zone and the connecting zone, and the perforations provide a plurality of outlets from the reaction zone for the solid contact mass material. Usually at least one additional perforated plate is spaced below the uppermost perforated plate, the perforations in each of the additional perforated plates having a smaller total area than in the plate immediately above it, and the perforations in each plate being staggered in relation to adjacent plates. Thus each plate functions to provide substantially uniform flow of the solid contact mass material from the space immediately above it.

It has been found, however, that in the tapered connecting zone between the reaction vessel and the solid contact mass material outlet, there is still a tendency for a greater proportion of the solid material to gravitate downwardly through those apertures nearest the diametric center of the zone. Thus, according to this invention, one or more proportioning plates are positioned in this connecting zone below the lowermost perforated plate. Each proportioning plate has an annular orifice therein, and means are provided in cooperation with the annular orifice which cause a greater flow through the orifice from radially outward of the orifice than from radially inward of the orifice. This means comprises a plurality of vertical plates traversing the orifice which divide the orifice into alternate comparatively large and comparatively small apertures. Means are provided which block communication of the large apertures radially inward of the orifice and which block communication of the small apertures radially outward of the apertures. The areas of the large and small apertures are so proportioned that a substantially uniform rate of flow prevails. Thus the apparatus of this invention effectually prevents a greater rate of flow in the center of the reactor than near the outer edge.

Figure 2:
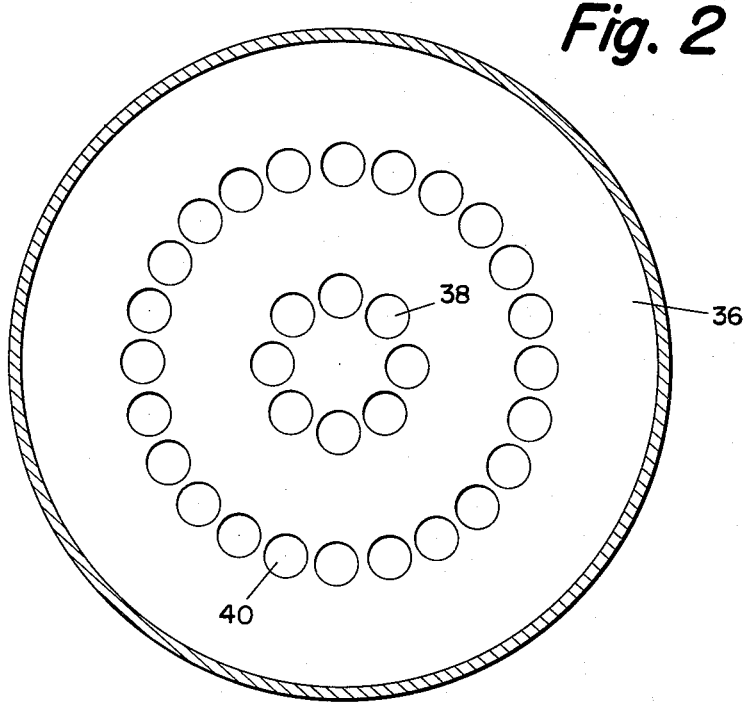
Figure 3:
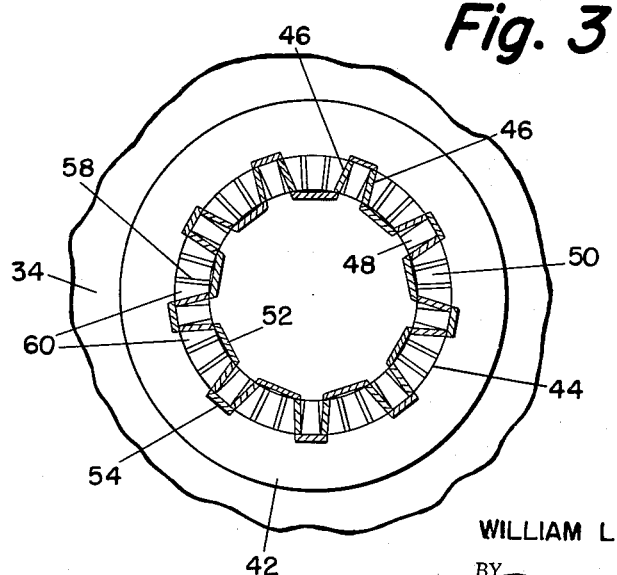

The invention may be more fully understood by reference to the accompanying drawings, wherein FIGURE 1 is a vertical sectional view of a reaction vessel fitted with the proportioning means of this invention, FIGURE 2 is a cross-sectional view taken on line 2—2 of FIGURE 1, and showing one of the perforated plates in the reaction vessel, and FIGURE 3 is a cross-sectional view taken on line 3—3 of FIGURE 1 and showing the proportioning means of this invention.

Referring to FIGURE 1, reaction vessel 10 is fitted with a solid contact mass material inlet duct 12 having a valve 14 to regulate the flow of solid contact mass material into the reaction vessel 10. Fluid reactants are admitted to the reaction vessel through conduit 16. Only one conduit 16 is shown in the drawing, but several may be provided together with distributing apparatus known in the art to secure more uniform contact with the solid contact mass material. The fluid reactant contacts the gravitating bed 18 composed of particle form solid contact mass material, whereby the desired reaction takes place. Reaction products are drawn off through conduit 20. In some instances, it is desirable to switch conduits 16 and 20, so that fluid reactants are admitted at the top and products drawn off at the lower position. The bed of solid contact mass material gravitates downwardly through apertures 22, 23, 24 and 26 of perforated partitioning plate 28. Plate 28 defines the lower end of the reaction zone, and the upper end of a connecting zone between the reaction zone and outlet 30 at the bottom of the reaction vessel through which the solid contact mass material passes from the reaction vessel. Outlet 30 is fitted with a valve 32 for controlling the flow of the solid contact mass material therethrough.

At least a portion of the connecting zone is tapered as at 34 to reduce the cross-sectional area of the reaction vessel from that at the reaction zone to that at the outlet 30. Partitioning plate 28 is shown in the drawing to be above the beginning of the tapered portion, although it may be positioned coincident with the top of the tapered portion, or a portion of the tapered section may extend slightly above partitioning plate 28.

Spaced below partitioning plate 28 is an additional perforated partitioning plate 36 having apertures 38 and 40. The total area of apertures 38 and 40 is less than the total area of apertures 22, 23, 24 and 26 in plate 28. The apertures in both plates are arranged so as to provide approximately uniform flow therethrough from substantially all the area immediately above them. For example, as shown in FIGURE 2, apertures 38 and 40 are in the form of circular holes arranged in concentric circles. In addition the apertures in plate 36 are staggered in relation to those in plate 28, so that no aperture is directly below another, as clearly seen in FIGURE 1.

When the apertures in plates 28 and 36 are arranged in concentric circles, as is shown in the drawing it is desirable that the plates and the apertures therein be positioned so that substantially uniform flow prevails through the apertures. The various factors which affect the flow of the particle form solid contact mass material are not entirely clear. It is believed, however, that major factors include the angle of repose and the flow cone angle of the contact mass material. The angle of repose is indicated by reference numeral 41 in the drawing, and is the angle that the side of a pile of the particle form material makes with the horizontal. The flow cone angle, indicated by reference numeral 43, defines the outermost line of flow of particles from a bed of the particle form solid contact mass material through a passageway below the surface of the bed. Where pelleted catalyst materials make up the contact mass, the angle of repose is approximately 30°, and the flow cone angle is approximately 78°. These angles are generally taken into account in locating plates 28 and 36 and the apertures therein, so that the flow of the particle form solid contact mass material is directed in the desired manner. Thus, in the drawing, the plates and apertures are so positioned that apertures 22 and 23 feed apertures 38, and apertures 24 and 26 feed apertures 40. Maximum uniformity of flow is thereby achieved.

Although two partitioning plates are shown in the drawing, good results may also be obtained with only one such plate, or with more than two plates. The number of plates selected depends on a number of factors, including the height and diameter of the reactor, the desired flow rate therethrough, and the character of the solid contact mass material.

It has been found that such partitioning plates cannot be depended upon to provide substantially uniform flow through the reactor, especially in the tapered section. This failure of such plates is due in part to warpage of the plates caused by the high temperatures and heavy loads. This warpage changes the relationship between the various apertures, which, as pointed out above, is an important factor in maintaining uniformity of flow. In addition, it is difficult to accurately position the plates when installing them so as to provide maximum uniformity of flow.

According to the present invention, one or more proportioning plates 42 are provided spaced below the lowermost perforated plate. Although only one proportioning plate 42 is shown on the drawing, it is within the scope of this invention to provide two or more such proportioning plates vertically spaced apart from each other. Plate 42 has an annular orifice 44 through which solid contact mass material may gravitate to outlet 30.

Orifice 44 is positioned radially inwardly of apertures 40 in plate 36, and radially outwardly of apertures 38. A plurality of vertical plates 46, as seen in FIGURE 3, are affixed to the top of proportioning plate 42, and traverse orifice 44. Vertical plates 46 divide orifice 44 into alternate comparatively small apertures 48 and comparatively large apertures 50. The small apertures 48 are wider on the radially inward side than on the radially outward side, and the large apertures 50 are wider on the radially outward side than on the radially inward side. The purpose of this feature is to avoid restriction of the flow of the solid contact mass material as it flows horizontally toward apertures 48 and 50, and such structure is preferred, although it is not necessary in all cases.

A plurality of inner vertical baffle plates 52 are affixed to the top of proportioning plate 42 and extend upwardly therefrom coextensive with vertical plates 46. Inner vertical baffle plates 52 are adjacent and extend tangentially with the inner edge of annular orifice 44 between each pair of vertical plates 46 which define one of the comparatively large apertures 50. Similarly, a plurality of outer vertical baffle plates 54 are affixed to the top of proportioning plate 42 and extend upwardly therefrom coextensive with vertical plates 46. Other vertical baffle plates 54 are adjacent and extend tangentially with the outer edge of annular orifice 44 between each pair of vertical plates 46 which define one of the comparatively small apertures 48. A horizontal, annular flat cover plate 56 abuts and is attached to the upper end of all of the vertical plates 46, 52 and 54, and extends radially from the inner vertical baffle plates 52. The size and position of each of these elements is in part determined by the angle of repose and flow cone angle of the particle form solid contact mass material, so that apertures 50 are fed only by apertures 40 in plate 36, and apertures 48 are fed only by apertures 38 in plate 36.

Thus the comparatively large apertures 50 communicate with the space above proportioning plate 42 which is radially outward of the orifice 44 and the comparatively small apertures 48 communicate with the space above proportioning plate 42 which is radially inward of orifice 44. Inner vertical baffle plate 52 and cover plate 56 comprise means blocking communication of the large apertures radially inward of the orifice, and outer vertical baffle plate 54 and cover plate 56 comprise means blocking communication of the small apertures radially outward of the orifice.

Vertical plates 46 are positioned so as to define apertures 48 and 50 having a size proportionate to the amount of solid contact mass material which is to be supplied to each of them. For example, when the partitioning plate immediately above the proportioning plate has apertures therein distributed as are the apertures 38 and 40 in plate 36, approximately 3 times as much of the solid contact mass material will gravitate downwardly through apertures 40 as through apertures 38, since 3 times as much area is available, and therefore 3 times as much material would be fed to proportioning plate 42 radially outwardly of orifice 44 as would be fed radially inwardly of orifice 44. The proportioning means, i.e., plates 46, 52, 54 and 56, are therefore so arranged and positioned that apertures 50 communicating outwardly of the orifice have approximately 3 times the area of apertures 48, which communicate inwardly of the orifice.

One or more horizontal perforated plates such as plates 28 and 36 are generally used, and the use of at least one such plate is preferred, since more uniform flow of the solid contact mass material is attained thereby. The benefits of the invention can, however, in some instances be obtained without such perforated plates.

Vertical plates 58 are fixed to the bottom of proportioning plate 42, and extend downwardly therefrom. Plates 58 radially traverse orifice 44, dividing the orifice into substantially equal apertures 60. In the drawing apertures 60 are shown to be substantially equal in area to the comparatively small apertures 48, however, this is not a necessary feature. The purpose of providing equal apertures 60 is to eliminate inequality in bridging of the solid contact mass material passing through the proportioning plate, so that the desired flow proportion is maintained.

Support members 62 and annular support ring 64 serve to support the portion of proportioning plate 42 which is within the annular orifice 44.

When more than one proportioning plate 42 is provided in the reactor, those plates above the lowermost proportioning plate are advantageously provided with two or more concentric annular orifices 44, so as to provide substantially uniform flow in the portion of the reactor adjacent such plate.

Although the reaction vessel is shown in the drawing to be of circular cross-section, the invention is equally applicable to reaction vessels having other shapes, such as square or hexagonal.

The invention claimed is:

1. Apparatus for contacting fluids with particle form solid contact mass material and with substantially equal exposure of all portions of the solid material, comprising a reaction vessel, an inlet for solid contact mass material at the top of said vessel, a relatively small outlet for solid contact mass material at the bottom of said vessel, conduit means to supply fluids to said vessel, conduit means to remove reaction products therefrom, the space within the reaction vessel between the conduit means defining a reaction zone, at least two horizontal, vertically spaced-apart plates defining partitions in said reaction vessel below said reaction zone, a plurality of apertures in each of said plates except the lowermost plate, a greater total aperture area in each of said plates than in the plate immediately below it, said apertures in each of said plates being staggered in relation to apertures in adjacent plates, an annular orifice in the lowermost plate spaced radially inwardly of the outermost of said apertures and outwardly of the innermost of said apertures, a plurality of vertical plates traversing said annular orifice and extending upwardly therefrom, said vertical plates dividing said orifice into alternate comparatively large and comparatively small apertures, said comparatively large apertures being wider at the radially outward edge than at the radially inward edge, and said comparatively small apertures being wider at the radially inward edge than at the radially outward edge, means blocking communication of said comparatively large apertures radially inwardly of said orifice, means blocking communication of said comparatively small apertures radially outwardly of said orifice, and means extending downwardly of said orifice dividing said orifice into substantially equal apertures, each of substantially the same area as said comparatively small apertures.

2. Apparatus for contacting fluid reactants with particle form solid contact mass material and with substantially equal exposure of all portions of the solid material, comprising a reaction vessel, an inlet for solid contact mass material at the top of said vessel, a relatively small outlet for solid contact mass material at the bottom of said vessel, conduit means to supply fluid reactants to said vessel, conduit means to remove reaction products therefrom, the space within the reaction vessel between said conduit means defining a reaction zone, at least two horizontal, vertically spaced-apart plates defining partitions in said reaction vessel below said reaction zone, a plurality of apertures in each of said plates except the lowermost plate, a greater total aperture area in each of said plates than in the plate immediately below it, said apertures in each of said plates being staggered in relation to apertures in adjacent plates, an annular orifice in the lowermost plate spaced inwardly of the outermost of said apertures, a plurality of vertical plates traversing said annular orifice and extending upwardly therefrom, said vertical plates dividing said orifice into alternate comparatively large and comparatively small apertures, a plurality of inner vertical baffle plates on said lowermost plate, extending upwardly therefrom coextensive with said first-named vertical plates and adjacent and extending tangentially with the inner edge of said annular orifice between each pair of said first-named plates which define the comparatively large apertures in said annular orifice, a plurality of outer vertical baffle plates on said lowermost plate, extending upwardly therefrom coextensive with said first-named vertical plates, adjacent and extending tangentially with the outer edge of said annular orifice between each pair of said first named plates which define the comparatively small apertures in said annular orifice, and a horizontal, annular flat cover plate abutting and attached to the upper end of all of said vertical plates and extending radially from said inner vertical baffle plates to said outer vertical baffle plates.

3. Apparatus for contacting fluid reactants with particle form solid contact mass material and with substantially equal exposure of all portions of the solid material, said apparatus comprising means defining a reaction zone; means to supply contact mass material thereto; means to supply fluid reactants thereto; means to remove reaction products therefrom; a discharge duct for said contact mass material of lesser area than said reaction zone; means defining a connecting zone intermediate said reaction zone and said duct; a proportioning plate in said connecting zone defining a partition between said reaction zone and said discharge duct, said plate having an annular orifice providing for flow of said contact mass material through said plate; plates which extend upwardly from said orifice, dividing said orifice into apertures and forming a chamber above each of the apertures, each of the chambers being closed at the top and being closed laterally from the adjacent chambers, said chambers comprising chambers which are open radially inwardly and closed radially outwardly, alternating with chambers which are open radially outwardly and closed radially inwardly, the chambers which are open outwardly and the apertures therebeneath being larger than the chambers which are open inwardly and the apertures therebeneath, whereby solids from the outer portions of the apparatus have access to a greater area for flow through said orifice than the solids from the inner portions of the apparatus.

4. Apparatus according to claim 3 wherein a plurality of parallel spaced horizontal plates are positioned in said connecting zone, the uppermost of said plates constituting a partition between said reaction zone and said connecting zone, and the lowermost of said plates being said proportioning plate.

5. Apparatus according to claim 4 wherein each of said horizontal plates other than said proportioning plate contains a plurality of apertures, and wherein said annular orifice is spaced radially inwardly of the outermost of said apertures and radially outwardly of the innermost of said apertures.

6. Apparatus according to claim 5 wherein each of said horizontal plates has a greater total aperture area than the plate immediately below it, the apertures in each of said plates being staggered in relation to apertures in adjacent plates.

References Cited in the file of this patent

UNITED STATES PATENTS

| | | |
|---|---|---|
| 2,393,893 | Evans | Jan. 29, 1946 |
| 2,430,669 | Crowley | Nov. 11, 1947 |
| 2,490,828 | Newton | Dec. 13, 1949 |
| 2,554,413 | Kuhn | May 21, 1951 |
| 2,843,274 | Williams | July 15, 1958 |